(12) United States Patent
Mahe

(10) Patent No.: US 6,535,488 B1
(45) Date of Patent: Mar. 18, 2003

(54) PATH DETECTION IN A DISTRIBUTED NETWORK

(75) Inventor: Jean-Michel Mahe, Suce-sur-Erdre (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/184,657

(22) Filed: Nov. 3, 1998

(30) Foreign Application Priority Data

Nov. 3, 1997 (FR) .............................................. 97 13783
Nov. 3, 1997 (FR) .............................................. 97 13784

(51) Int. Cl.$^7$ ................................................. H04L 3/14
(52) U.S. Cl. ................................... 370/238; 370/238.1
(58) Field of Search ............................. 370/238, 238.1; 455/422, 428; 379/114.02

(56) References Cited

U.S. PATENT DOCUMENTS

| | | | |
|---|---|---|---|
| 5,142,531 A | 8/1992 | Kirby ........................ 370/94.3 |
| 5,245,607 A | 9/1993 | Caram ....................... 370/94.1 |
| 5,253,161 A | 10/1993 | Nemirovsky et al. ....... 364/402 |
| 5,262,906 A | 11/1993 | Mazzola ...................... 370/54 |
| 5,317,566 A | 5/1994 | Joshi ........................... 370/60 |
| 5,343,466 A | 8/1994 | Kawamura .................. 370/54 |
| 5,394,436 A | 2/1995 | Meier et al. ................ 375/202 |
| 5,404,451 A | 4/1995 | Nemirovsky et al. ....... 395/200 |
| 5,453,977 A | 9/1995 | Flammer, III et al. ........ 370/54 |
| 5,481,535 A | 1/1996 | Hershey ...................... 370/60 |
| 5,596,719 A | 1/1997 | Ramakrishnan ........ 395/200.02 |
| 5,608,726 A | 3/1997 | Virgile ....................... 370/401 |
| 5,740,160 A | 4/1998 | Ikegami et al. ............. 370/255 |
| 5,799,071 A * | 8/1998 | Azar et al. ............. 379/114.02 |
| 5,805,593 A | 9/1998 | Busche ....................... 370/396 |
| 5,812,531 A | 9/1998 | Cheung et al. ............. 370/255 |
| 5,848,145 A | 12/1998 | Gallagher et al. .......... 379/220 |
| 5,886,643 A | 3/1999 | Diebboll et al. ....... 340/825.08 |
| 5,901,362 A | 5/1999 | Cheung et al. ............. 455/525 |
| 5,914,939 A | 6/1999 | Serkowski .................. 370/254 |
| 5,930,236 A | 7/1999 | Havansi ...................... 370/254 |
| 5,949,760 A | 9/1999 | Stevens et al. ............. 370/254 |
| 5,956,652 A * | 9/1999 | Eriksson ..................... 455/422 |
| 5,963,546 A | 10/1999 | Shoji .......................... 370/255 |
| 5,970,050 A * | 10/1999 | Johnson ...................... 370/238 |
| 6,067,452 A * | 5/2000 | Alexander .................. 455/428 |
| 6,104,701 A * | 8/2000 | Avargues et al. ........... 370/238 |
| 6,289,096 B1 | 9/2001 | Suzuki ........................ 379/221 |

FOREIGN PATENT DOCUMENTS

| | | |
|---|---|---|
| EP | 0 481 610 | 4/1992 |
| EP | 0 726 663 | 8/1996 |
| WO | WO 96/19887 | 6/1985 |
| WO | WO 97 02677 | 1/1997 |

OTHER PUBLICATIONS

N. Shacham, et al., "Future Directions in Packet Radio Architectures and Protocols", Proceedings of the IEEE, vol. 75, No. 1, Jan. 1987, pp. 83–99.

J. Jubin, et al., "The DARPA Packet Radio Network Protocols", Proceedings of the IEEE, vol. 75, No. 1, Jan. 1987, pp. 21–32.

* cited by examiner

*Primary Examiner*—Salvatore Cangialosi
(74) *Attorney, Agent, or Firm*—Fitzpatrick, Cella, Harper & Scinto (57) ABSTRACT

A method of routing messages between stations of a network is characterised in that each of the stations performs the following operations: storage (E104, E102) of data concerning each message which it receives and including at least one message identifier (ID, ISS), an identifier (TSS) for the station sending the message, and a message transmission cost (CT), and, after having stored the data of two messages whose message identifiers (ID, ISS) are identical and whose sending station identifiers (TSS) are different, comparison of the transmission costs (CT) of the two messages in order to determine the sending station associated with the lowest cost. The invention makes it possible to detect paths in the network.

26 Claims, 7 Drawing Sheets

Fig. 3

| | destination | next jump | cost |
|---|---|---|---|
| TR$_c$ → | SM$_a$ | SM$_b$ | 2 |
| | SM$_b$ | SM$_b$ | 1 |
| | SM$_c$ | SM$_c$ | 0 |
| | SM$_d$ | SM$_d$ | 1 |
| | SM$_e$ | SM$_d$ | 2 |

PATH DETECTION IN A DISTRIBUTED NETWORK

The present invention concerns the routing of communications between the stations of a distributed type network.

The network is for example a local wireless network, the stations of which communicate with one another by sharing a radio channel.

A distributed type network does not have a base station to manage the communications between the stations. A routing function makes communications possible between the stations of the network, by determining the communication paths in the network. This function is adapted to the constraints of a local wireless network, notably the limited passband, and the mobility of the stations or alterations in the station environment which produce changes in the network topology.

Known routing methods are based on periodic exchanges of routing messages in order to detect changes in network topology. The routing function must modify the communication paths in the network as quickly as possible, so that the known paths correspond to the actual paths existing in the network, otherwise the risk of faulty routing and loss of messages is great. It is therefore necessary for the routing messages to be frequent.

However, the routing messages occupy the radio channel, to the detriment of useful data. The routing function must therefore generate as few routing messages as possible, in order to occupy little passband.

These constraints are conflicting and make the operation of the routing function complex.

The present invention aims to remedy the drawbacks of the prior art, firstly by providing a method of path detection in a distributed network, which makes it possible to detect new paths quickly and with no increase in routing traffic.

To this end, the invention proposes a method of message routing between stations of a network, characterised in that each of the stations performs the following operations:

storage of data concerning each message it receives and including at least a message identifier, an identifier of the sending station of the message and a message transmission cost, and, after having stored the data of two messages whose message identifiers are identical and sending station identifiers are different, comparison of the transmission costs of the two messages in order to determine the sending station associated with the lowest cost.

The method according to the invention resolves the problem stated above, by using the data messages transported in the network in order to derive therefrom routing information.

The data storage is carried out in a specific table, or log, intended to gather information on the messages heard by the station under consideration.

The method makes it possible to evaluate the performance of the current routing algorithm.

The method is adapted to any known routing function, the execution of which is independent of the method according to the invention.

According to a preferred characteristic, the method includes the transmission of the routing information formed by the knowledge of the sending station associated with the lowest cost to a processing station, which then uses this information.

According to a preferred characteristic, the cost is the cumulative number of all the previous messages having the same message identifier as the message under consideration. In other words, the cost is the number of jumps made from an initial message sending station, and thus measures a path length.

According to another preferred characteristic, the message identifier includes the address of the initial sending station of the first of the previous messages having the same message identifier as the message under consideration. The messages are thus identified simply and reliably.

The invention also concerns a network communication station, characterised in that it includes, or in that it is adapted to cooperate with:

means of storing data concerning each message it receives, these data including at least a message identifier, an identifier of the sending station of the message and a message transmission cost, means of checking that the data of two messages whose message identifiers are identical and sending station identifiers are different, have been stored, and means of comparing the transmission costs of two messages whose message identifiers are identical and whose sending station identifiers are different, in order to determine the sending station associated with the lowest cost.

The station according to the invention has the same advantages as those of the method which were described previously.

Secondly, the present invention providing a method of path detection and transmission of routing information in a distributed network, which makes it possible to detect new paths and transmit the corresponding information, quickly and with no increase in routing traffic.

To this end, the invention proposes a method of message routing between stations of a network, characterised in that any station under consideration performs the following operations:

storage of data concerning each message it receives and including at least a message identifier, an identifier of the sending station of the message and a message transmission cost, and, after having stored the data of at least two messages whose message identifiers are identical and sending station identifiers are different, sending of a specific message which includes on the one hand an acknowledgement intended for one of the sending stations of the said at least two messages and on the other hand routing data intended for at least the other of the sending stations of the said at least two messages.

The method according to the invention solves the problem stated above, by using the data messages transported in the network to derive routing information from these which is then transmitted to other stations of the network.

The specific message is not an additional message, but rather an acknowledgement message supplemented by routing information. The traffic is thus not increased, since an acknowledgement is always sent in the case of point-to-point transmission.

The data storage is carried out in a specific table, or log, intended to gather information on the messages heard by the station under consideration.

The method is adapted to any known routing function, the execution of which is independent of the method according to the invention.

The method makes it possible to modify the routing tables of stations of the network very quickly, independently of the periodicity of execution of the routing algorithm.

By virtue of the method according to the invention, the mobile stations know the alterations in the paths in the network. Taking these alterations into account to modify their routing table, the mobile stations can transport the messages by shorter paths, the consequence of which is to decrease the transportation times of the messages in the network.

According to preferred characteristics, the routing data include at least the address of the station under consideration, the address of a final destination station of the said at least two messages, and a cost of transmission between the station under consideration and the final destination station of the said at least two messages, or the routing data include even the whole routing table of the station under consideration.

These data make it possible to modify the routing table of the destination station of the routing data.

According to a preferred characteristic, the message identifier includes the address of the initial sending station of the first of a set of previous messages having the same message identifier as the said at least two messages. The messages are thus identified simply and reliably.

According to a preferred characteristic, the station for which the acknowledgement is intended sent one of the said at least two messages, this message being addressed to the station under consideration. The invention thus allows conventional processing of this part of the specific message.

According to another aspect, the invention proposes a method of message routing between stations of a network, the stations each having a respective routing table, characterised in that any station under consideration performs the following operations, when it receives a specific message including on the one hand an acknowledgement intended for one station and on the other hand routing data intended for at least one other station:

ascertaining whether the station under consideration is the destination of the routing data of the specific message, and, in the event of a positive reply, modification of the routing table of the station under consideration according to the routing data of the specific message.

The routing table is thus modified quickly and it will be possible to use a new path as from the next message to be transported.

The invention also concerns a network communication station, characterised in that it includes, or in that it is adapted to cooperate with:

means of storing data concerning each message it receives and including at least a message identifier, an identifier of the sending station of the message and a message transmission cost, means of checking that the data of at least two messages, whose message identifiers are identical and sending station identifiers are different, have been stored, and means of sending a specific message which includes on the one hand an acknowledgement intended for one of the sending stations of the said at least two messages and on the other hand routing data intended for at least the other of the sending stations of the said at least two messages.

The invention also concerns a network communication station including a respective routing table for transporting messages between stations of the network, characterised in that it includes, or in that it is adapted to cooperate with:

means of receiving a specific message including on the one hand an acknowledgement intended for one station and on the other hand routing data intended for at least one other station, means of ascertaining whether the station under consideration is the destination of the routing data of the specific message, and, in the event of a positive reply, means of modifying the routing table of the station under consideration according to the routing data of the specific message.

The communication station according to the invention has the same advantages as those of the method described previously.

The present invention also concerns a storage medium, such as a floppy disk or a CD-ROM.

The advantages of this storage medium are similar to those previously described.

The characteristics and advantages of the present invention will emerge more clearly from a reading of preferred embodiments illustrated by the accompanying drawings, in which.

Figure 1:
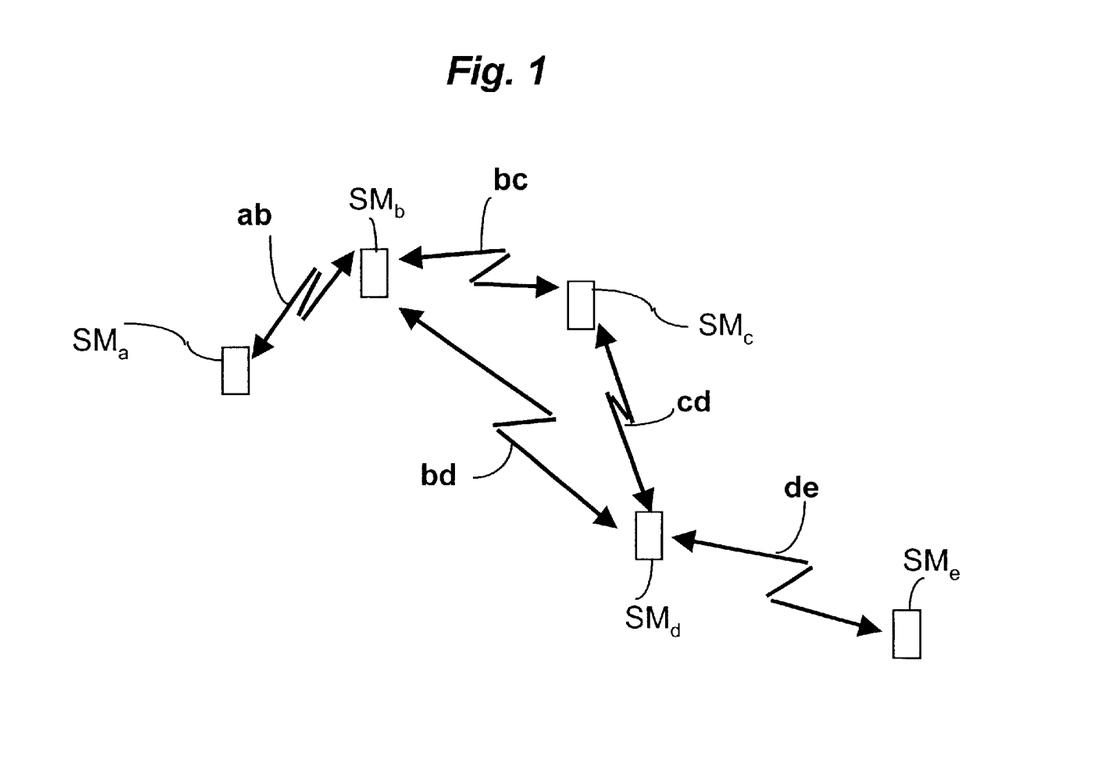
FIG. 1 depicts a distributed network of stations.

According to the embodiment chosen and depicted in FIG. 1, a local wireless network includes stations, five of which, referenced $SM_a$ to $SM_e$, are depicted. Here the stations are mobile. The connectivity of the mobile stations is continuously changing, according to the movements of the stations and alterations in their environment. Furthermore, it is possible that the number of mobile stations actually connected to the network also changes. The stations communicate with one another by radio transmission, or as a variant by infrared transmission. Each station, or node of the network, is located by a unique address. Communications in point-to-point mode are of more particular interest here.

The network is of the distributed type, that is to say it does not have a base station to manage the inter-station communications. Inter-station communications are made possible by a routing function. If two stations, for example the stations $SM_a$ and $SM_b$, are in direct hearing, that is to say if these two stations are sufficiently close to one another and without any obstacle to radio transmission, they can communicate directly over the segment "ab". The station $SM_a$ can send a message, detailed subsequently, to the station $SM_b$. The station $SM_a$ is referred to as the initial sending station, and the station $SM_b$ is referred to as the final destination station.

On the other hand, if two stations, for example the stations $SM_a$ and $SM_d$, cannot communicate directly, the communication goes through other intermediate stations, here the stations $SM_b$ and $SM_c$, which act as relays between the two stations $SM_a$ and $SM_d$. The message is then transmitted successively over the segments "ab", then "bc", and finally "cd". These three segments form a path between the stations $SM_a$ and $SM_d$.

The routing function is executed on top of a MAC (Medium Access Control) access mechanism of CSMA/CA (Carrier Sense Multiple Access/Collision Avoidance) type which makes it possible to share the transmission channel. In the case of point-to-point communications, as considered here, the reliability of the data communications is ensured by the use of a conventional receipt, or acknowledgement, mechanism, and retransmission of the data, if the acknowledgement is not received.

The routing function is known per se and will not be described further.

Figure 2:
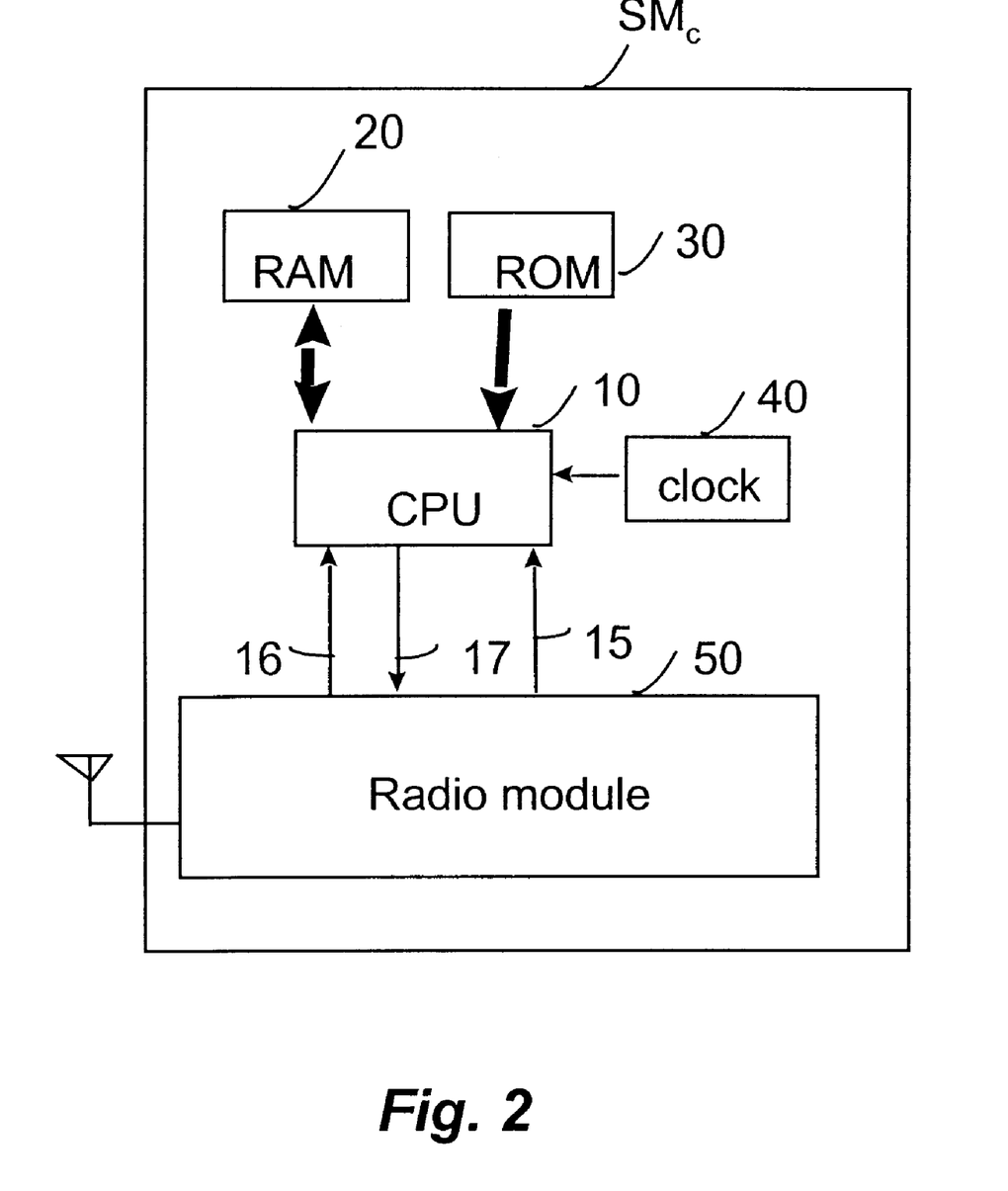
FIG. 2 depicts a mobile station of the network of FIG. 1.

An embodiment of any one of the stations, for example the station $SM_c$, is depicted in FIG. 2. The means of implementing the invention are incorporated into a computer which has conventional user interfaces, not described here. As a variant, the means of implementing the invention are not incorporated into a mobile station proper, but these means and the mobile station are adapted to communicate and cooperate together.

The station $SM_c$ incorporates a central processing unit in the form of a processor 10 connected by a bus on the one hand to a read-only memory (ROM) 30 in which the programs executed by the processor are recorded, and on the other hand to a random access memory (RAM) 20 having a working area, data registers and an area reserved for the storage of messages received or awaiting transmission. The random access memory 20 stores, among other things, a log, described subsequently, corresponding to the table of the latest messages received and heard by the mobile station $SM_c$.

The mobile station $SM_c$ includes a radiofrequency communication module 50, known per se, allowing the mobile station $SM_c$ to send and receive data to and from other mobile stations.

The interface between the radiofrequency communication module 50 and the processor 10 is achieved by:
the control port 15, the binary value of which represents the occupancy state of the wireless transmission medium at a given instant,
the read port 16, from which the processor 10 reads the data received by the mobile station $SM_c$,
the write port 17, where the mobile station $SM_c$ can go to write the data it wishes to send via the radiofrequency transmission medium.

A clock 40, connected to the processor 10, allows the latter to carry out operations at regular intervals, such as for example, the read/write operations to the ports 15, 16, 17.

The mobile station $SM_c$ allows the users of the local wireless network to exchange data along paths which may vary over time and which may make use of a number of intermediate stations, these paths being established from routing tables of the mobile stations of the network.

Figure 3:
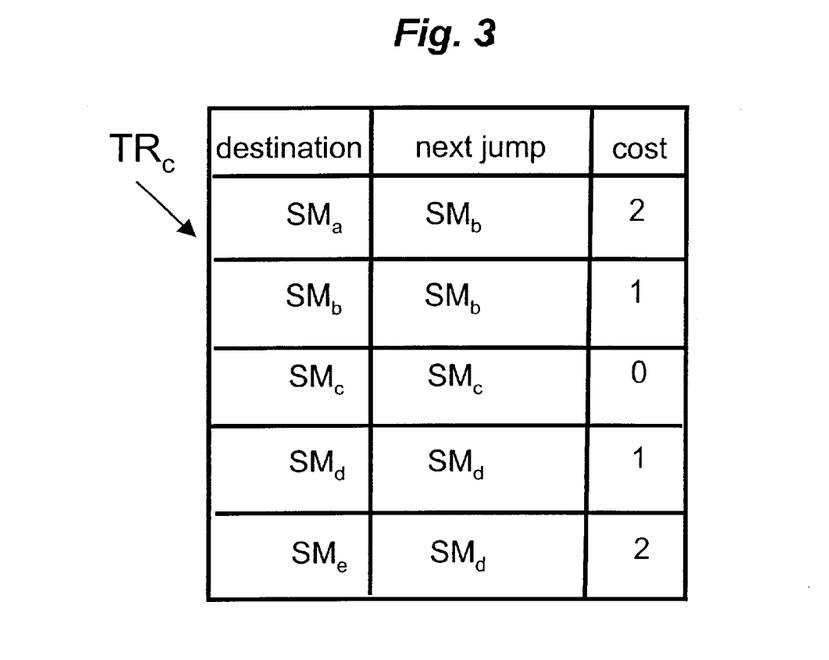
FIG. 3 depicts a routing table of one of the mobile stations of the network of FIG. 1.

To implement the routing function, each mobile station has in memory a routing table depicted in FIG. 3. The routing table $TR_c$ of the station $SM_c$ includes a list of each station accessible from the station under consideration, the next station to be reached in order to reach each accessible station and the cost to reach each accessible station. The cost is for example the number of jumps necessary, that is to say the number of segments to be covered, in order to reach each of the accessible stations. According to variant embodiments, the cost may take into account for example the signal to noise ratio, the message reception level, the routing times, or the number of neighbouring stations of the station under consideration, or may again be a combination of these parameters.

Thus, for example, it is possible to reach the station $SM_e$ from the station $SM_c$, the next station being $SM_d$, and the cost, that is to say here the number of jumps, being two.

The routing table of a station is valid at a given instant, and is capable of changing over time.

Furthermore, the routing table of a station may include other information, such as sequence number and flag, for example, which are not of use for the present invention.

Figure 4:
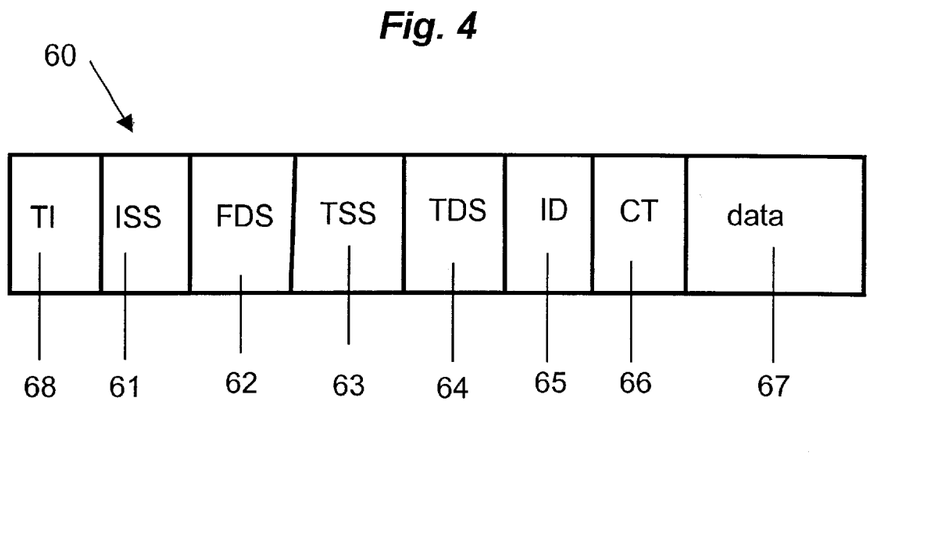
FIG. 4 depicts a data message transmitted from one mobile station to another.

As depicted in FIG. 4, the data are exchanged between stations in the form of a message 60 including at least the following fields:
the field 61 containing the address ISS of the initial sending station of the message,
the field 62 containing the address FDS of the final destination station of the message,
the field 63 containing the address TSS of the intermediate sending station,
the field 64 containing the address TDS of the intermediate destination station,
the field 65 containing a message identifier ID created by the initial sending station,
the field 66 containing the cost CT of the message, updated by each intermediate station and by the final destination station,
the field 67 of data proper,
the field 68 containing the type TI of the message, here a data message.

The initial sending and final destination stations are the ends of the path to be covered by the message. The intermediate sending and intermediate destination stations are the ends of a segment of the path.

Figure 5:
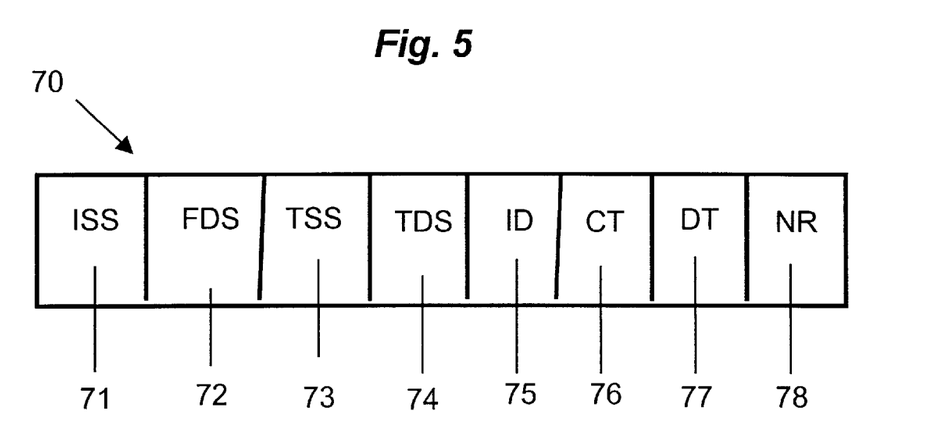
FIG. 5 depicts an extract from a table of messages heard by one of the mobile stations of the network, according to the invention.

Each station stores data on each data message it hears, even for the messages not intended for it. These data are stored in a specific table, or log, the predetermined size of which, corresponding to a time window, is chosen according to a maximum message routing time in the network. As depicted in FIG. 5, for each data message heard, the station $SM_d$ stores the following data:
the field 71 containing the address ISS of the initial sending station of the message,
the field 72 containing the address FDS of the final destination station of the message,
the field 73 containing the address TSS of the intermediate sending station,
the field 74 containing the address TDS of the intermediate destination station,
the field 75 containing the message identifier ID created by the initial sending station,
the field 76 containing the cost CT of the message, updated by each station which hears the message,
the field 77 containing the date DT of hearing the message,
the field 78 containing the number NR of retransmissions.

The values of the first six fields are derived from the message heard and the last two are updated by the station $SM_d$. The date of hearing 15 DT and the number of retransmissions NR are not used by the present invention and can be used notably to check the routing times and retransmissions. The cost CT is here equal to the accumulated number of all the preceding messages having the same identifier as the message under consideration.

Figure 6:
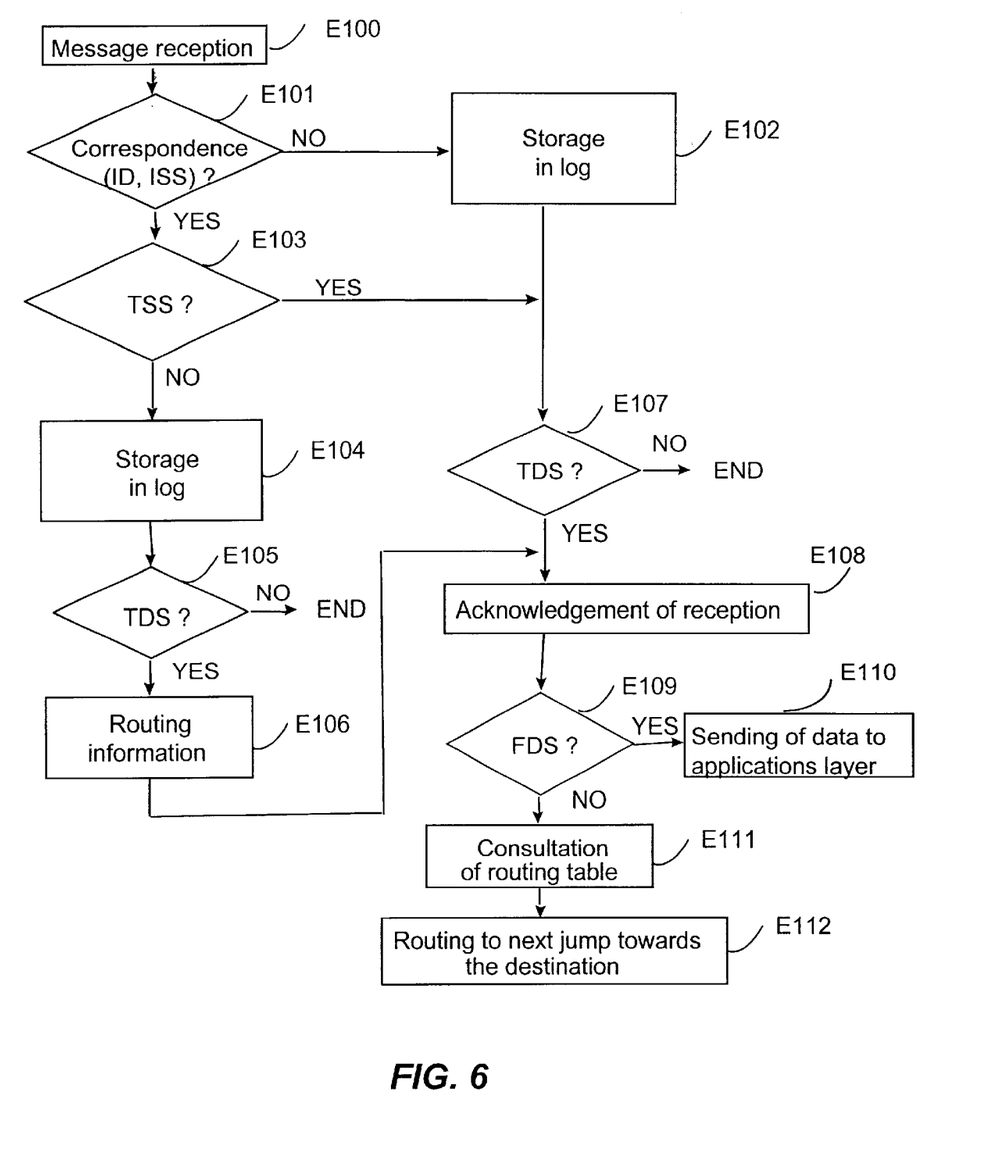
FIG. 6 is an algorithm for data message processing and path detection, according to the invention.

FIG. 6 depicts an algorithm, according to a first embodiment of the invention, used in each of the mobile stations of the network, when a data message is received, in order to process this message, and in order to detect whether a shorter path exists. The algorithm includes steps E100 to E112, which are stored in the read-only memory 30.

This algorithm can also be, totally or partially, memorised in any storage medium capable of cooperating with the processor 10. This storage medium is integrated or can be detachably mountable on the communication station. For example, the storage medium is a floppy disk, or a CD-ROM.

Step E100 is the reception of a data message by the mobile station. For this purpose, the processor 10 regularly reads the port 16 in order to check whether the radio module 50 has received data. When a message is received, the processor reads the type of message in the field 68 indicating that it is a case of a data message.

After the reception of a message, step E100 is followed by step E101, which is a test to check whether the message corresponds to a message already stored in the station log. The test consists of comparing the pair formed from the identifier ID of the message and the address ISS of the initial sending station of the message with the pairs formed from the message identifier and message initial sending station address which are stored in the log of the station under consideration.

If the reply is negative, the step E101 is followed by the step E102, at which the data relating to the message in the course of processing are stored in the station log. The data stored are those depicted in FIG. 5. The step E102 includes updating of the cost. Where the cost is the number of jumps, or segments covered, the stored cost is equal to the cost read from the field 66 of the message, incremented by one unit. The step E102 is followed by the step E107 which will be described subsequently.

If the reply at the step E101 is positive, this means that there is correspondence between the message in the course of processing and a message previously received and stored. The step E101 is then followed by the step E103, which is a test to check whether the message in the course of processing and the message already stored which corresponds to it were sent by the same intermediate sending station. The test consists of comparing the intermediate sending station address of the message in the course of processing with that, stored in the respective field 73, of the message which corresponds to it. If the reply is positive, this means that the message in the course of processing is a retransmission of a previous message, between the same intermediate sending and destination stations, this retransmission being caused by a lack of reception of any acknowledgement by the intermediate sending station. The data relating to the message in the course of processing are not stored and the retransmission number NR of the previous message is incremented by one unit. The step E103 is followed by the step E107, which will be described subsequently.

If the reply at the step E103 is negative, this means that the message in the course of processing and the message already stored which corresponds to it were sent by two distinct intermediate sending stations. This step is followed by the step E104, at which the data relating to the message in the course of processing are stored in the station log, as depicted in FIG. 5. The step E104 includes updating of the cost. Where the cost is the number of jumps, or segments covered, the stored cost is equal to the cost read from the field 66 of the message, incremented by one unit.

The step E104 is followed by the step E105, which is a test to determine whether the station under consideration is the intermediate destination station of the message in the course of processing. The test consists of comparing the address of the station and the intermediate destination station address TDS of the message.

If the reply is negative, execution of the algorithm is terminated. The message is not retransmitted by the station, since it is not the intermediate destination station of the message.

If the reply at the step E105 is positive, this means that the message in the course of processing has on the one hand been sent to the station under consideration, and that on the other hand it corresponds to a message previously heard by the station. This means that the station under consideration can be reached, from the initial sending station of the message in the course of processing, by two distinct paths. The paths are determined notably by the intermediate sending stations, the addresses TSS of which are read from the log.

The respective cost of each path is known. It is therefore possible to determine the path having the lowest cost, which constitutes routing information. Where the cost is the number of segments covered, the message previously heard by the station will be that which was transported along the path having the lowest cost, that is to say the shortest path.

The following step E106 is the sending of the routing information determined at step E105 to a network management application. This management application can be integrated into the station under consideration, or be located in a specific station of the network, or again in a processing station which does not form part of the network. In the latter case, the processing station can be fixed, or can be connected by a cable connection to one of the stations of the network. Step 106 is followed by step 108, which will be described subsequently.

In a variant the routing information is also formed and sent to the network management application, even where the message currently being processed has not been sent to the station under consideration.

The steps E102 and E103 are followed by the step E107, which is identical to the step E105 described previously. The step E107 is a test to determine whether the station under consideration is the intermediate destination station of the message in the course of processing. The test consists of comparing the address of the station and the intermediate destination station address TDS of the message in the course of processing.

If the reply is negative, execution of the algorithm is terminated.

If the reply is positive, the step E107 is followed by the step E108, which is the sending of an acknowledgement message to the intermediate sending station of the message in the course of processing.

The following step E109 is a test for determining whether the station under consideration is the final destination station of the message currently being processed. The test consists of comparing the address of the station and the address FDS of the final destination station of the message.

If the reply is positive, the routing of the message is terminated, and step E109 is followed by step E110, which is the transmission of the data contained in the data field 67 of the message to the applications layer of the station in order to process the information received.

If the reply at the step E109 is negative, this step is followed by the step E111, which is the consultation of the routing table of the station under consideration, in order to determine which is the intermediate destination station to which the station under consideration must send a message containing the data to be transported, according to the final destination station of the message.

The following step E112 is the formation of a message and the sending of this message to the intermediate destination station determined previously, the address of which is written in the field 64 of this new message. The address ISS of the initial sending station, the final destination station address FDS, the message identifier ID and the data proper of this new message are copied into the corresponding fields of the message in the course of processing. The cost CT is updated by the station under consideration. The address TSS of the intermediate sending station of this new message is that of the station under consideration.

Referring again to FIG. 1, it is assumed that data are to be sent from the station $SM_a$ (the initial sending station) to the station $SM_e$ (the final destination station). These data are put in the form of a message sent over the segment "ab", which will then cause the sending of messages, containing the same data, successively over the segments "bc", "cd" and "de", according to the routing tables of the stations concerned. The stations $SM_a$, $SM_b$, $SM_c$ and $SM_d$ are successively intermediate sending stations, and the stations $SM_b$, $SM_c$, $SM_d$ and $SM_e$ are successively intermediate destination stations.

When the station $SM_b$ sends the message to the station $SM_c$, it is assumed that the station $SM_d$ hears the message and stores it in its log.

When the station $SM_c$ in its turn sends the message to the station $SM_d$, the latter determines that this message corresponds to a message already heard and stored. The station $SM_d$ has thus determined that a shorter path exists between itself and the stations $SM_a$ and $SM_b$, this path making use of the segment "bd".

This routing information can be used by an applications layer. For example, when a network of stations is set up in premises, the invention makes it possible to determine preferred locations for the stations, or at least for their sending/receiving part, for the purpose of promoting the fluidity and speed of the data exchanges. It is thus possible to shorten the paths by reducing the number of segments thereof, or again to avoid a given station being a compulsory passage point for an excessively large number of paths.

Knowledge of the paths in the network makes it possible for example to choose the arrangement of sending/receiving antennae, which makes it possible to optimise the radio cover of the network. The method can be used whenever it is wished to check the topology of the network.

Figure 7A:
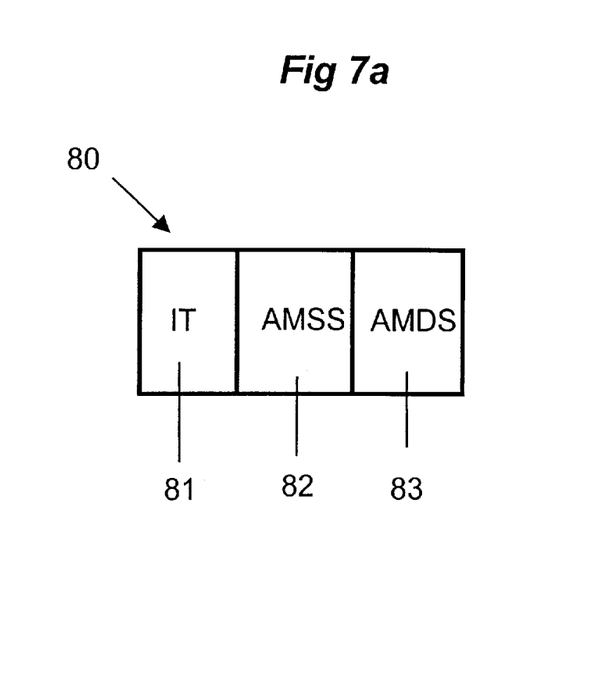
FIG. 7a is a conventional acknowledgement message.

When a station receives a message of which it is the intermediate or final destination station, the station under consideration sends a conventional acknowledgement message 80, depicted in FIG. 7a, to the station which sent the message.

The conventional acknowledgement message 80 includes at least the following fields:
 a field 81 containing an indicator TI of the message type,
 a field 82 containing the address AMSS of the acknowledgement message sending station,
 a field 83 containing the address AMDS of the acknowledgement message destination station.

This conventional message 80 is suitable when a single message is being processed at a given instant (anticipation window of one), which is the case in the CSMA context. The conventional message 80 may also include a field containing the identifier ID of the data message, and a field containing the address ISS of the initial sending station of the data message. These additional fields make it possible to identify the data message being processed, when it is not necessarily unique at the instant under consideration.

When the destination station of the acknowledgement message receives the latter, it knows that the message it sent has been correctly received by the destination station. The message is not retransmitted.

Figure 7B:
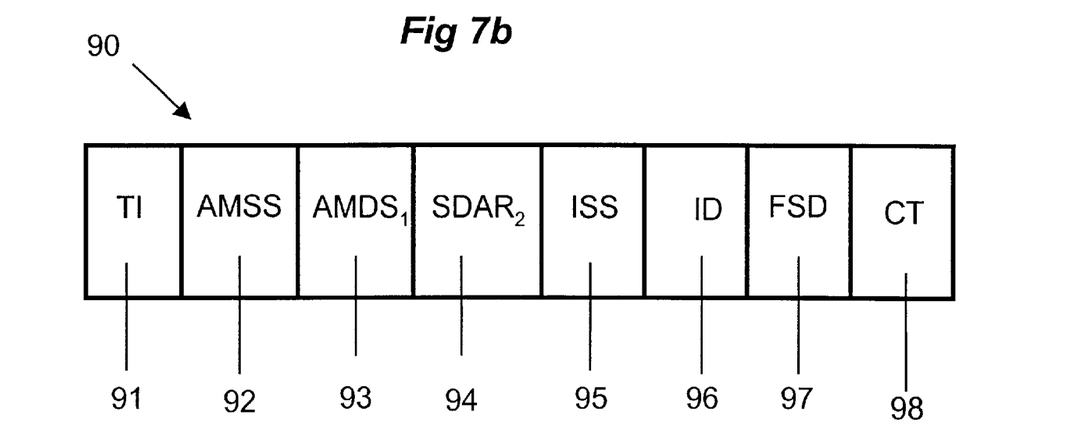
FIG. 7b is an acknowledgement message according to the invention.

FIG. 7b depicts a specific acknowledgement message 90 according to the second embodiment of the invention. This message is sent instead of the conventional acknowledgement message when the destination station of the message has detected that a shorter path exists, as described subsequently.

The specific acknowledgement message 90 includes the following fields:
 a field 91 containing an indicator TI of the message type, for indicating that the message is an acknowledgement,
 a field 92 containing the address AMSS of the acknowledgement message sending station,
 a field 93 containing the address $AMDS_1$ of a first destination station of the acknowledgement message,
 a field 94 containing the address $AMDS_2$ of at least one second destination station of the acknowledgement message,
 a field 95 containing the address ISS of the initial sending station of the message,
 a field 96 containing the identifier ID of the message,
 a field 97 containing the address FDS of the final destination station of the message,
 a field 98 containing the cost CT between the station under consideration and the final station of the message.

According to variants, which may be combined:
 the field 98 does not only contain the cost CT between the station under consideration and the final station of the message, but contains the whole routing table of the station under consideration,
 the acknowledgement message contains the addresses of a number of second destination stations of the acknowledgement message,
 the first and second destination station addresses $AMDS_1$ and $AMDS_2$ of the specific acknowledgement message are replaced by an address of a group of stations, referred to as a "multicast address". All the stations of the group then become destinations of the specific acknowledgement message.

Figure 8:
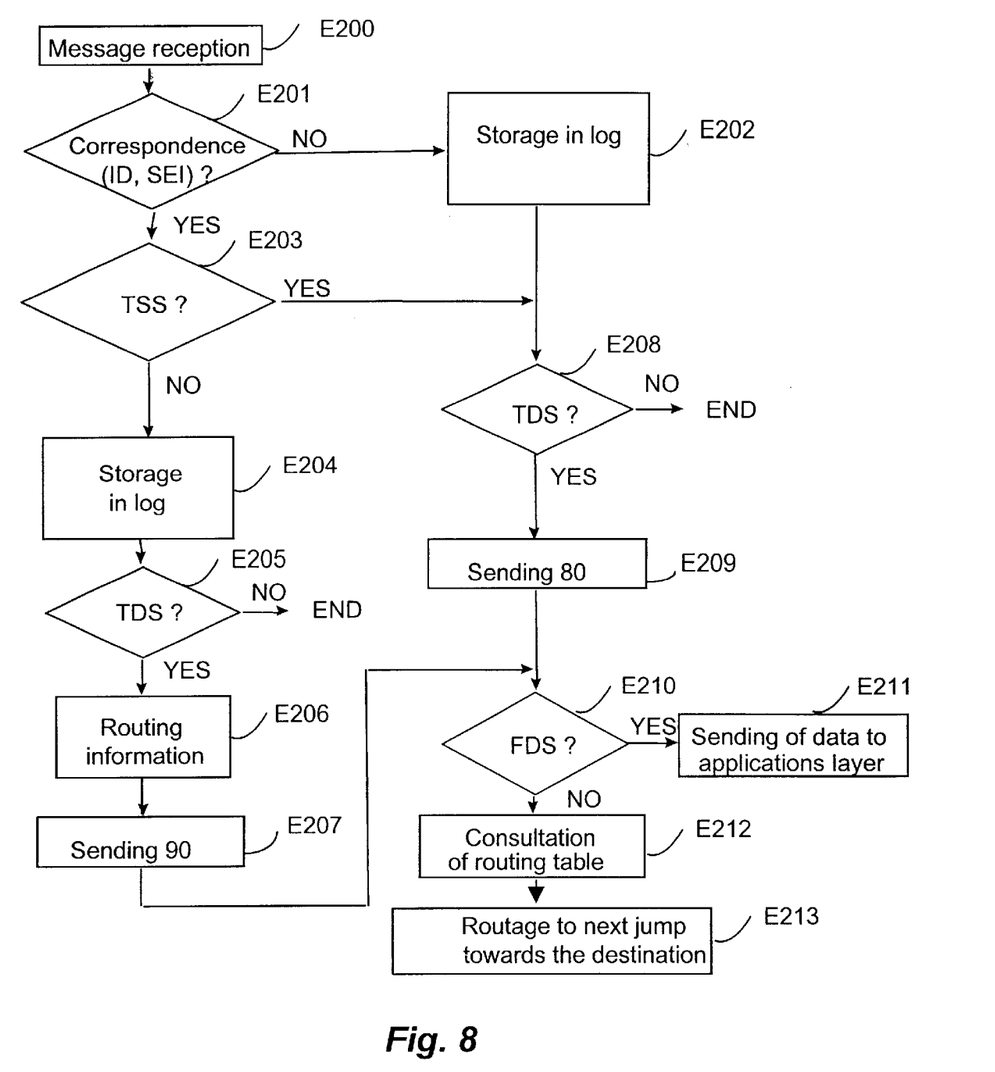
FIG. 8 is an algorithm for data message processing, path detection and acknowledgement message sending, according to the invention.

FIG. 8 depicts an algorithm, according to the second embodiment of the invention, implemented in each mobile station of the network, when a message is received, for processing this message, detecting whether a shorter path exists, and sending an acknowledgement message. The algorithm includes steps E200 to E213 which are stored in read-only memory 30.

The step E200 is the reception of a message by the mobile station. For this, the processor 10 regularly reads the port 16 to check whether the radio module 50 has received any data.

After the reception of a message, the step E200 is followed by the step E201, which is a test to check whether the message corresponds to a message already stored in the station log. The test consists of comparing the pair formed by the identifier ID of the message and the address ISS of the initial sending station of the message with the pairs formed by the message identifier and message initial sending station address which are stored in the log of the station under consideration.

If the reply is negative, the step E201 is followed by the step E202 at which the data relating to the message being processed are stored in the station log. The data stored are those depicted in FIG. 5. The step E202 includes the updating of the cost. Where the cost is the number of jumps, or segments covered, the stored cost is equal to the cost read from the field 66 of the message, incremented by one unit. The step E202 is followed by the step E208 which will be described subsequently.

If the reply at the step E201 is positive, this means that there is correspondence between the message being processed and a message previously received and stored. The step E201 is then followed by the step E203, which is a test to check whether the message being processed and the message already stored which corresponds to it were sent by the same intermediate sending station. The test consists of comparing the intermediate sending station address of the message being processed with that, stored in the respective field 73, of the message which corresponds to it. If the reply is positive, this means that the message being processed is a retransmission of a previous message, between the same intermediate sending and destination stations, this retransmission being caused by a lack of reception of any acknowledgement by the intermediate sending station. The data relating to the message being processed are not stored and the number of retransmissions NR of the previous message is incremented by one unit. The step E203 is followed by the step E208 which will be described subsequently.

If the reply at the step E203 is negative, this means that the message being processed and the message already stored which corresponds to it were sent by two distinct intermediate sending stations. This step is followed by the step E204, at which the data relating to the message being processed are stored in the station log, as depicted in FIG. 5. The step E204 includes updating of the cost. Where the cost is the number of jumps, or segments covered, the stored cost is equal to the cost read from the field 66 of the message, incremented by one unit.

The step E204 is followed by the step E205, which is a test to determine whether the station under consideration is the intermediate destination station of the message being processed. The test consists of comparing the address of the station and the intermediate destination station address TDS of the message.

If the reply is negative, execution of the algorithm is terminated. The message being processed has not allowed a shorter path to be found. The message is not retransmitted by the station, since it is not the intermediate destination station of the message.

If the reply at the step E205 is positive, this means that the message being processed has on the one hand been sent to the station under consideration, and that on the other hand it corresponds to a message previously heard by the station. This means that the station under consideration can be reached, from the initial sending station of the message being processed, by two distinct paths. The paths are determined notably by the intermediate sending stations, the addresses TSS of which are read from the log.

The respective cost of each path is known. It is therefore possible to determine the path having the lowest cost, which constitutes routing information. In the case where the cost is the number of segments covered, the message previously heard by the station will be that which was transported along the path having the lowest cost, that is to say the shortest path.

The next step E206 is the sending of the routing information determined at the step E205 to a network management application.

The next step E207 is the transmission of a specific acknowledgement message 90 to the intermediate sending station of the messagd being processed and to the intermediate sending station of the corresponding message. The specific acknowledgement message 90 contains in its field 93 the address of the intermediate sending station of the message being processed (address $AMDS_1$) and in its field 94 the address of the intermediate sending station of the corresponding message (address $AMDS_2$).

The specific acknowledgement message 90 on the one hand enables the intermediate sending station of the message being processed to know that the message being processed has been received by the station under consideration. It then acts as a conventional acknowledgement. The specific acknowledgement message 90 on the other hand enables the intermediate sending station of the corresponding message to know that a shorter path exists between this station and the station under consideration. This information is contained in the fields 95 to 98.

The step E207 is followed by the step E210, which will be described subsequently.

The steps E202 and E203 are followed by the step E208, which is identical to the step E205 described previously. The step E208 is a test to determine whether the station under consideration is the intermediate destination station of the message being processed. The test consists of comparing the address of the station and the intermediate destination station address TDS of the message being processed.

If the reply is negative, execution of the algorithm is terminated.

If the reply is positive, the step E208 is followed by the step E209, which is the transmission of a conventional acknowledgement 80 to the intermediate sending station of the message being processed.

The step E209 is followed by the step E210, which is a test to determine whether the station under consideration is the final destination station of the message being processed. The test consists of comparing the address of the station and the final destination station address FDS of the message.

If the reply is positive, the transportation of the message is finished, and the step E210 is followed by the step E211, which is the transmission of the message to the applications layer of the station in order to process the received information, that is to say the information which was contained in the data field 67 of the message.

If the reply at the step E210 is negative, this step is followed by the step E212, which is the consultation of the routing table of the station under consideration, in order to determine which is the intermediate destination station to which the station under consideration must send a message containing the data to be transported, according to the final destination station of the message.

The next step E213 is the formation of a message and the sending of this message to the intermediate destination station determined previously, the address of which is written in the field 64 of this new message. The address ISS of the initial sending station, the final destination station address FDS, the message identifier ID and the data proper of this new message are copied into the corresponding fields of the message being processed. The cost CT is updated by the station under consideration. The address TSS of the intermediate sending station of this new message is that of the station under consideration.

Referring again to FIG. 1, it is assumed that data are to be sent from the station $SM_a$ (the initial sending station) to the station $SM_e$ (the final destination station). These data are put in the form of a message sent over the segment "ab", which will then cause the sending of messages, containing the same data, successively over the segments "bc", "cd" and "de", according to the routing tables of the stations concerned. The stations $SM_a$, $SM_b$, $SM_c$ and $SM_d$ are successively intermediate sending stations, and the stations $SM_b$, $SM_c$, $SM_d$ and $SM_e$ are successively intermediate destination stations.

When the station $SM_b$ sends the message to the station $SM_c$, it is assumed that the station $SM_d$ hears the message and stores it in its log.

When the station $SM_c$ in its turn sends the message to the station $SM_d$, thd latter determines that this message corresponds to a message already heard and stored. The station $SM_d$ has thus determined that a shorter path exists between itself and the stations $SM_a$ and $SM_b$, this path making use of the segment "bd".

This routing information is provided by the specific acknowledgement 90 sent by the station $SM_d$ to the station $SM_b$, which can then modify its routing table accordingly to take account of the new routing information.

Figure 9:
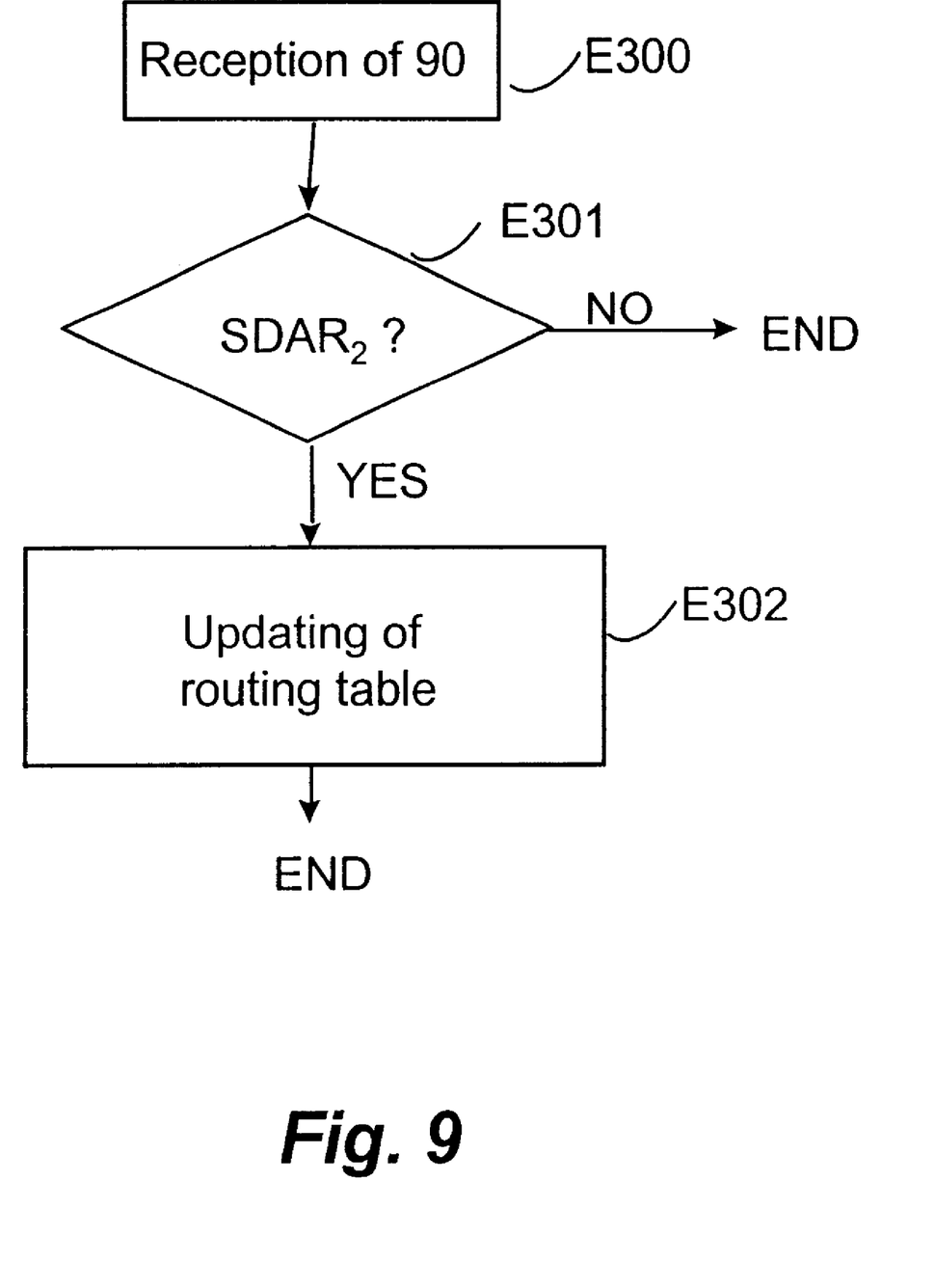
FIG. 9 is an acknowledgement message processing algorithm, according to the invention.

FIG. 9 depicts an algorithm for processing a specific acknowledgement message 90 according to the invention, which consists of steps E300 to E302 which are stored in read-only memory 30. The conventional acknowledgement message processing is performed otherwise in a known manner, and is not described here.

The step E300 is the reception of a specific acknowledgement message 90 by the mobile station. For this, the processor 10 regularly reads the port 16 to check whether the radio module 50 has received any data. When the processor 10 has detected reception of data, in the form of a message, it ascertains whether this message contains an indicator TI in the field 91 to indicate whether it is a specific acknowledgement 90.

In the case of a positive reply, the step E300 is followed by the step E301 which is a test to check whether the station under consideration is a second destination station of the acknowledgement message. The test consists of comparing the address of the station under consideration and the address $AMDS_2$ stored in the field 94 of the acknowledgement message.

If the reply is negative, execution of the algorithm is terminated. The message is not a specific acknowledgement intended for the station under consideration and is rejected by the station under consideration.

If the reply is positive, the step E301 is followed by the step E302 at which the routing table of the station under consideration is updated. The updating is performed according to the routing data contained in the specific acknowledgement message 90. These data make it possible to modify the paths determined by the routing table. This is because, by virtue of these data, the station which is a second destination station of the specific message 90 knows of the existence of a path between itself and the final destination station of the data message (this data message having given rise to the specific message 90), as well as the cost associated with this path.

Of course, the present invention is in no way limited to the embodiment described and depicted, but on the contrary includes any variant within the capability of persons skilled in the art.

Notably, the invention applies to any type of distributed network having mobile stations. By way of example, a constellation of satellites in low orbit (non-geostationary) can constitute such a network. The routing of communications between these satellites can be analysed by the present invention.

What is claimed is:

1. A method of message routing between stations of a network, wherein each of the stations performs the method, the method comprising the steps of:

storing data concerning each message the station receives, including at least a message identifier, an identifier of a sending station of the message, and a message transmission cost, the message transmission cost being a number of stations which have relayed the message; and after having stored the data of two messages whose message identifiers are identical and whose sending station identifiers are different, comparing transmission costs of the two messages in order to determine the sending station associated with the lowest cost.

2. The method according to claim 1, further comprising the step of transmitting the information about the sending station associated with the lowest cost to a processing station.

3. The method according to claim 1, wherein the message identifier includes an address of an initial sending station of a first of previous messages having the same message identifier as the message under consideration.

4. A method of message routing between stations of a network, wherein any station under consideration performs the method, the method comprising the steps of:

storing data concerning each message the station receives, including at least a message identifier, an identifier of a sending station of the message, and a message transmission cost, the message transmission cost being a number of stations which have relayed the message; and after having stored the data of at least two messages whose message identifiers are identical and whose sending station identifiers are different, sending a specific message which includes an acknowledgment intended for one of the sending stations of the at least two messages and routing data intended for at least the other of the sending stations of the at least two messages.

5. The method according to claim 4, wherein the routing data includes at least an address of the station under consideration, an address of a final destination station of the at least two messages, and a cost of transmission between the station under consideration and a final destination station of the at least two messages.

6. The method according to claim 4, wherein the routing data includes a routing table of the station under consideration.

7. The method according to claim 4, wherein the message identifier includes an address of an initial sending station of a first of a set of previous messages having the same message identifier as the at least two messages.

8. The method according to claim 4, wherein the station for which the acknowledgment is intended sent one of the at least two messages, the message being addressed to the station under consideration.

9. A method of message routing between stations of a network, the stations each having a respective routing table, wherein any station under consideration performs the method when it receives a specific message including an acknowledgment intended for one station and routing data intended for at least one other station, the method comprising the steps of:

ascertaining whether the station under consideration is a destination of the routing data of the specific message; and if a result of the ascertaining step is positive, modifying the routing table of the station under consideration according to the routing data of the specific message.

10. A network communication station, comprising:
means for storing data concerning each message the station receives, the data including at least a message identifier, an identifier of a sending station of the message, and a message transmission cost, the message transmission cost being a number of stations which have relayed the message;
means for checking whether the data of two messages whose message identifiers are identical and whose sending station identifiers are different have been stored; and
means for comparing the transmission costs of two messages whose message identifiers are identical and whose sending station identifiers are different, in order to determine a sending station associated with a lowest cost.

11. The station according to claim 10, further comprising means adapted to transmit information about the sending station associated with the lowest cost to a proccessing station.

12. A network communication station that is adapted to cooperate with communication means, the communication means comprising:
means for storing data concerning each message the communication means receives, the data including at least a message identifier, an identifier of a sending station of the message, and a message transmission cost, the message transmission cost being a number of stations which have relayed the message;
means for checking whether the data of two messages whose message identifiers are identical and whose sending station identifiers are different have been stored; and
means for comparing the transmission costs of two messages whose message identifiers are identical and whose sending station identifiers are different, in order to determine a sending station associated with a lowest cost.

13. The station according to claim 12, wherein the communication means further comprises means for transmitting information on the sending station associated with the lowest cost to a processing station.

14. A network communication station, comprising:
means for storing data concerning each message the station receives, including at least a message identifier, an identifier of a sending station of the message, and a message transmission cost, the message transmission cost being a number of stations which have relayed the message;
means for checking whether the data of at least two messages have been stored whose message identifiers are identical and whose sending station identifiers are different; and
means for sending a specific message which includes an acknowledgment intended for one of the sending stations of the at least two messages and routing data intended for at least the other of the sending stations of the at least two messages.

15. A network communication station that is adapted to cooperate with communication means, the communication means comprising:
means for storing data concerning each message it receives, including at least a message identifier, an identifier of a sending station of the message, and a message transmission cost, the message transmission cost being a number of stations which have relayed the message;
means for checking whether the data of at least two messages have been stored whose message identifiers are identical and whose sending station identifiers are different; and
means for sending a specific message which includes an acknowledgment intended for one of the sending stations of the at least two messages and routing data intended for at least the other of the sending stations of the at least two messages.

16. The station according to claim 14, wherein the sending means is adapted to form the specific message, routing data of which includes at least an address of the station, an address of a final destination station of the at least two messages, and a cost of transmission between the station and the final destination station of the at least two messages.

17. The station according to claim 14, wherein the sending means is adapted to form the specific message, the routing data of which includes a routing table of the station.

18. A network communication station including a respective routing table for transporting messages between stations of a network, comprising:
means for receiving a specific message which includes an acknowledgment intended for one station and routing data intended for at least one other station;
means for ascertaining whether the station is a destination of the routing data of the specific message; and
means for modifying the routing table of the station according to the routing data of the specific message, wherein the routing table is modified in a case where a positive result is obtained by the ascertaining means.

19. A network communication station including a respective routing table for transporting messages between stations of a network, the station being adapted to cooperate with communication means, the communication means comprising:
means for receiving a specific message including an acknowledgment intended for one station and routing data intended for at least one other station;
means for ascertaining whether the station is a destination of the routing data of the specific message; and
means for modifying the routing table of the station according to the routing data of the specific message, wherein the routing table is modified in a case where a positive result is obtained by the ascertaining means.

20. A storage medium storing a program for message routing between stations of a network, said program being performed by each of the stations, the program comprising the steps of:
storing data concerning each message the station receives, including at least a message identifier, an identifier of a sending station of the message, and a message transmission cost, the message transmission cost being a number of stations which have relayed the message; and
after having stored the data of two messages whose message identifiers are identical and whose sending station identifiers are different, comparing the transmission costs of the two messages in order to determine a sending station associated with a lowest cost.

21. The storage medium according to claim 20, wherein said storage medium is detachably mountable on a network communication station, wherein said network communication station comprises:
means for storing data concerning each message the station receives, the data including at least a message identifier, an identifier of a sending station of the message, and a message transmission cost, the message transmission cost being a number of stations which have relayed the message;

means for checking whether the data of two messages whose message identifiers are identical and whose sending station identifiers are different have been stored; and means for comparing the transmission costs of two messages whose message identifiers are identical and whose sending station identifiers are different, in order to determine a sending station associated with a lowest cost.

22. A storage medium storing a program for routing messages between stations of a network, said program being performed by any station under consideration, the program comprising the steps of:

storing data concerning each message the station receives, including at least a message identifier, an identifier of a sending station of the message, and a message transmission cost, the message transmission cost being a number of stations which have relayed the message; and after having stored the data of at least two messages whose message identifiers are identical and whose sending station identifiers are different, sending a specific message which includes an acknowledgment intended for one of the sending stations of the at least two messages and routing data intended for at least the other of the sending stations of the at least two messages.

23. The storage medium according to claim 22, wherein said storage medium is detachably mountable on a network communication station, wherein said network communication station comprises:

means for storing data concerning each message the station receives, including at least a message identifier, an identifier of a sending station of the message, and a message transmission cost, the message transmission cost being a number of stations which have relayed the message;

means for checking whether the data of at least two messages have been stored whose message identifiers are identical and whose sending station identifiers are different; and means for sending a specific message which includes an acknowledgment intended for one of the sending stations of the at least two messages and routing data intended for at least the other of the sending stations of the at least two messages.

24. A storage medium storing a program for routing messages between stations of a network, the stations each having a respective routing table, said program being performed when any station under consideration receives a specific message including an acknowledgment intended for one station and routing data intended for at least one other station, the program comprising the steps of:

ascertaining whether the station under consideration is a destination of the routing data of the specific message; and in a case where a positive result is ascertained, modifying the routing table of the station under consideration according to the routing data of the specific message.

25. The storage medium according to claim 24, wherein said storage medium is detachably mountable on a network communication station including a respective routing table for transporting messages between stations of the network, wherein said network communication station comprises:

means for receiving a specific message including an acknowledgment intended for one station and routing data intended for at least one other station;

means for ascertaining whether the station is a destination of the routing data of the specific message; and means for modifying the routing table of the station according to the routing data of the specific message, wherein the routing table is modified in a case where a positive result is obtained by the ascertaining means.

26. The storage medium according to claim 20, wherein said storage medium is a floppy disk or a CD-ROM.

* * * * *